March 24, 1970　　　　F. ADAMOLI　　　　3,502,522
METHOD FOR MANUFACTURING PLASTIC KNICKERS AND A MACHINE
FOR CARRYING OUT THE METHOD, AS WELL
AS BABY PANTS THUS OBTAINED
Filed Oct. 18, 1966　　　　　　　　　　　　2 Sheets-Sheet 2
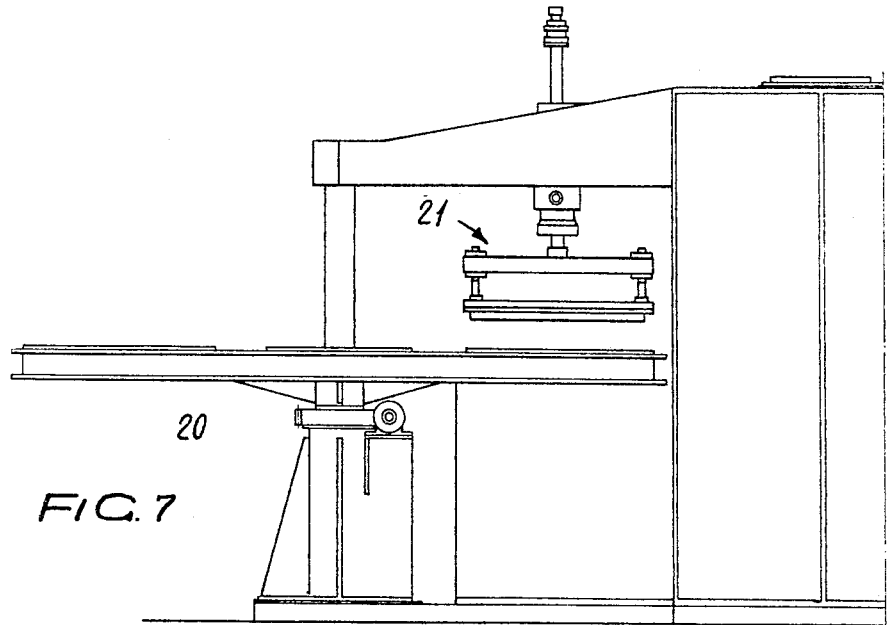
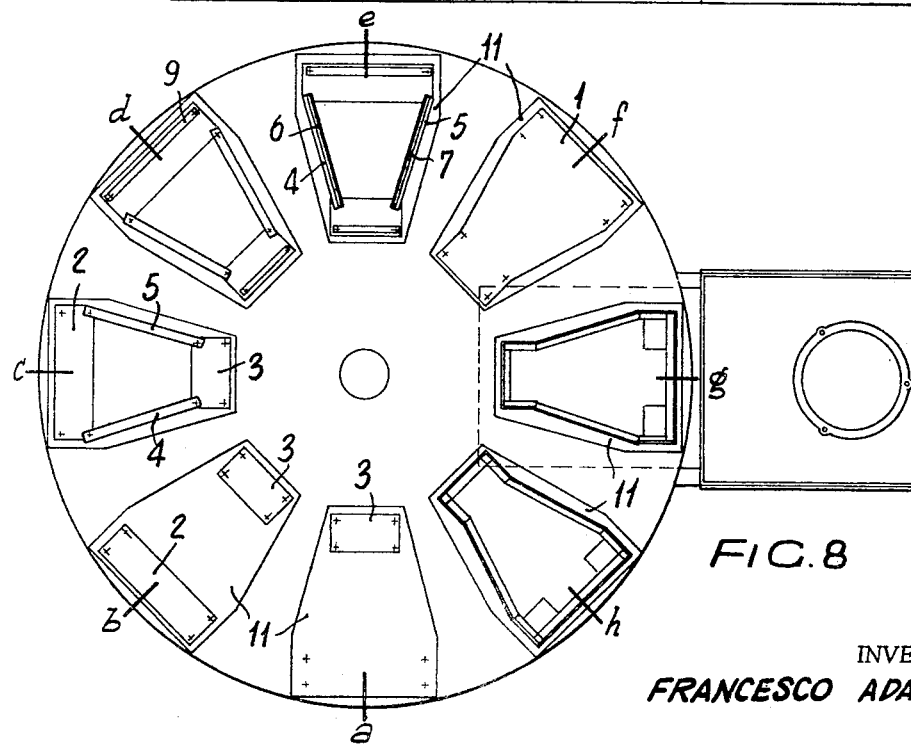
INVENTOR
FRANCESCO ADAMOLI
BY Yount, Raney, Flynn & Tarolli
ATTORNEYS United States Patent Office 3,502,522
Patented Mar. 24, 1970

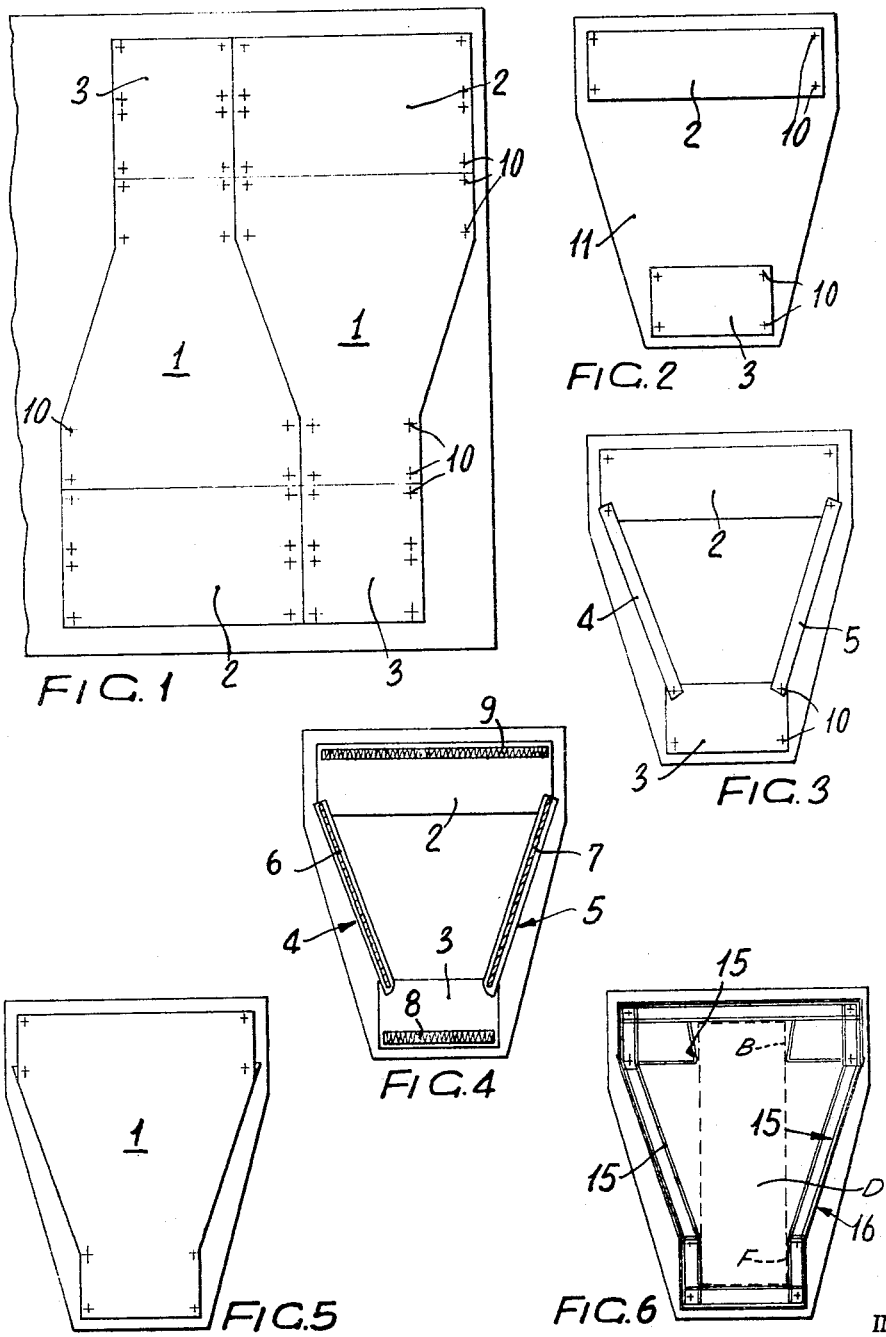

3,502,522
METHOD FOR MANUFACTURING PLASTIC KNICKERS AND A MACHINE FOR CARRYING OUT THE METHOD, AS WELL AS BABY PANTS THUS OBTAINED
Francesco Adamoli, % Sapim-Sesto S. Giovanni, Viale Casiraghi 413, Milan, Italy
Filed Oct. 18, 1966, Ser. No. 587,544
Claims priority, application Italy, Oct. 23, 1965, 10,448/65; Aug. 9, 1966, 21,239/66
Int. Cl. A41b 13/04; B32b 3/00
U.S. Cl. 156—70                                7 Claims

ABSTRACT OF THE DISCLOSURE

In an improved method and apparatus for manufacturing baby pants, plastic material is cut into pieces including a body piece and side pieces. The side pieces are welded to the body piece to provide the baby pants with front and back pockets for receiving the ends of a disposable napkin or diaper.

---

The present invention relates to a method of manufacturing baby pants, and a machine for use in carrying out the method, as well as the plastic baby pants manufactured by the method.

Various methods of manufacturing plastic baby pants are already known. However, these methods require a relatively high number of operations and involve substantial waste of materials.

Accordingly, the principal object of the present invention is to provide a method for manufacturing baby pants wherein the number of method steps and operations required are substantially reduced and the amount of waste materials are practically reduced to zero with the result that there are substantial savings of both material and labor.

A further object of the present invention is the provision of a new and improved machine for use in carrying out a method of making plastic baby pants and which provides for a relatively quick and easy assembly of the plastic baby pants.

A still further object of the present invention is the provision of a new and improved baby pants structure constructed of a relatively few number of parts so that the manufacture of the baby pants may be accomplished with a minimum of labor and waste of materials.

Further objects and advantages of the present invention will be apparent to those skilled in the art to which it relates from the following detailed description of a preferred embodiment thereof made with reference to the accompanying drawings forming a part of this specification and in which:

FIGS. 1–6 illustrate various steps in the method of making baby pants in accordance with the present invention; and FIGS. 7 and 8 are elevational and plan views, respectively, of a machine for use in carrying out the method.

In accordance with the present invention, a new and improved method of manufacturing baby pants is provided. In performing the method, a plurality of superimposed plastic strips are simultaneously cut with a suitable punching member to produce from each strip two sets of three shaped pieces, designated 1, 2, and 3 in the drawings. Each set of pieces 1, 2, and 3 are then assembled into a completed baby pants structure.

The piece 1 of each of the sets may be termed a central piece and is designed to form the body of the final baby pants structure. The shape of the central piece may be defined as including an isosceles trapezoid area or zone and two rectangular areas or zones having their long sides corresponding to the trapezoid bases. The pieces 2 and 3 are designed to form pockets for the baby pants, which pockets are adapted to receive opposite portions of a diaper or napkin. The pieces 2 and 3 are rectangular in shape and are approximately twice the size of a corresponding rectangular area of the central piece. The edges of each piece 2 and 3 fits together with the adjacent edge of its corresponding rectangular area of the piece 1.

The pieces 1, 2, and 3 of different sets are cut as shown in FIG. 1 so that the adjacent pieces have a common cut line therebetween so that in cutting no waste material will result. In each piece 1, 2 and 3 there is formed a plurality of reference holes, designated by the cross marks shown in the drawings and designated reference numeral 10.

After the pieces of the above-described form have been cut from the material, the pieces are assembled on a plate 11, shown in FIG. 2. The plate 11 is provided with a plurality of reference points or pins which penetrate into the reference holes 10 of the pieces. The piece 3 is bent on itself along a median line thereof and is placed on the plate 11. The folded edge of the piece 3 is located inwardly of the plate so that the front and back portions of the piece 3 are outwardly opened. The piece is located on the plate so that the outer edges thereof will coincide with the perimeter of the central piece 1 at its lower rectangular zone, as viewed in FIG. 1, and as will be described hereinbelow.

The piece 2 is then placed on the plate 11. The piece 2 is bent forward on itself along a median line thereof and is placed on the plate 11 in a manner similar to that in connection with the piece 3. The piece 2 has its folded edge located inwardly of the plate and with the open edges thereof facing outwardly of the plate. The outer edges of the piece 2 are positioned on the plate in such a manner so that they will coincide with the upper rectangular zone of the piece 1 when the piece 1 is placed on the plate 11, as will be described hereinbelow.

The next step in the formation of the baby pants embodying the present invention is shown in FIG. 3 and includes the positioning of two strips 4 and 5 made of the same plastic material as the pieces 1, 2, and 3 in such a manner that the strips are secured to each of the pieces 2 and 3. The strips 4 and 5, respectively, are positioned so that each strip extends between a corner of the bent rectangular piece 2 and the nearest corner of the bent rectangular piece 3, as illustrated in FIG. 3.

After the pieces 2, 3, 4 and 5 have been assembled, as illustrated in FIG. 3, rubber bands 8, 9 are respectively applied to the pieces 2, 3. The rubber band 9 is positioned at the outer edge of the piece 2, as illustrated in FIG. 4, and the rubber band 8 is similarly positioned at the outer edge of piece 3. Thereafter, rubber bands 6, 7 are respectively applied to the strips 4, 5. The rubber bands 8, 9 and 6, 7 are positioned so as to extend over the pins on the plate 11 and are stretched somewhat when positioned on the plate so that these bands are somewhat in tension.

After the rubber bands have been positioned, as illustrated in FIG. 4, the body portion of the baby pants, namely, piece 1 is superimposed on the various pieces arranged as described hereinabove. When the body piece 1 is superimposed on the various pieces, as illustrated in FIG. 4, the baby pants are substantially wholly assembled.

Thereafter, the various pieces are secured in an assembled relation by a single actuation of a welding mechanism. The welding mechanism accomplishes all of the various required weldings, designated 15 in the drawings. The welding is accomplished in such a manner as to maintain the rubber bands 6, 7, 8 and 9 under tension and in a stretched condition.

The welding forms the front pocket F of the baby pants and the back pocket B of the baby pants, as shown in FIG. 6. These pockets, of course, are designed to receive the ends of a disposable napkin or diaper. At the same time that the welding is effected at the various locations 15, the baby pants may be trimmed effectively around the perimetrical edge 16 to provide the desired shape for the final baby pants structure. As illustrated in FIG. 6, a disposable diaper D is shown in dotted lines extending into the front and back pockets of the disposable diaper.

From the above-described method, it is thus possible to manufacture plastic baby pants with a substantial savings of material and labor and wherein the baby pants are better finished than those manufactured by known methods. Suitable snaps or other fastening devices may be secured to the perimeter portions at the locations having the reference holes, as shown in FIG. 6, so as to provide for securing the baby pants on the baby.

Referring now to FIGS. 7 and 8, it will be seen that according to this invention all of the operations of the above-described method, except for the cutting of the material, are carried out by utilizing the apparatus shown in these figures. As shown in FIGS. 7 and 8, the apparatus comprises a rotary indexible table 20 which has a plurality, namely, eight, of the assembly plates 11 spaced therearound, each of the plates 11 being located at a working station, designated by the letters a–h. The apparatus also includes a welding mechanism, designated 21, which is located at the working station designated g. The welding mechanism 21 may be of any suitable known construction capable of effecting the welds 15 described hereinabove. As illustrated in the drawings, the various assembly steps for manufacturing the baby pants are performed at the stations a through g. It should be apparent that the rectangular piece 3 is positioned on the plate 11 at station a. At station b the rectangular piece 2 is positioned on the plate, at station c the strips 4, 5 are located on the plate, at station d the rubber bands 8, 9 are positioned on the plate, at station e the rubber bands 6, 7 are positioned on the strips 4, 5, at station f the overlying body piece 1 is positioned in overlying relation to the other assembled parts, and at station g the welding of the baby pants is performed. Finally, at station h the trimming and removal of the finished baby pants from the plate 11 may be effected.

It should be noted that the rotary table 20 may accommodate plates of different sizes in accordance with the size of the baby pants to be manufactured.

The present invention has been described hereinabove in considerable detail and it is intended to cover all modifications, adaptations, and changes therein coming within the scope of the appended claims.

Having described my invention, I claim:

1. A method of manufacturing plastic baby pants comprising the steps of providing a body piece of plastic material having a shape defined by the union of an isosceles trapezoid with two rectangles having their long sides thereof corresponding to the trapezoid bases and two separate rectangular side pieces, positioning said rectangular side pieces in a spaced relationship, positioning a pair of plastic strips interconnecting adjacent corners of said side pieces, placing resilient bands on each of said strips and applying yieldable bands to the outer edge of said rectangular pieces, superimposing said body piece on said rectangular pieces and said strips, and effecting the welding of said pieces together around the periphery of the central piece to provide assembled baby pants with front and back pockets defined by said rectangular pieces and a portion of said central piece.

2. A method of manufacturing plastic baby pants as defined in claim 1 wherein each of said pieces is positioned on a plate having positioning pins thereon and wherein each of said pieces has reference holes for receiving the pins for positioning of the pieces thereon.

3. A method of manufacturing plastic baby pants as defined in claim 1 wherein each of said rectangular pieces has a dimension twice the corresponding dimension of the corresponding rectangular area of said body piece and further including the step of bending each of said rectangular pieces along a median line to form a rectangle substantially the size of the rectangular area of said body piece so that the rectangular area of the body piece substantially overlies the folded rectangular piece during the assembly of the baby pants.

4. The method as defined in claim 1 wherein said welding of said various pieces is effected by a single blow of a welding mechanism.

5. A method of manufacturing plastic baby pants as defined in claim 1 further including the steps of providing a rotary table having a positioning plate located thereon and indexing said table to position said plate at different work stations where different ones of said method steps are performed with said welding step being performed at one station only.

6. A method of manufacturing plastic baby pants as defined in claim 1 further comprising the steps of simultaneously cutting a plurality of superimposed plastic strips so as to obtain from the strips a set of said body and rectangular pieces with said pieces having a common cut line and the adjacent central pieces on each strip facing in opposite directions in order to minimize waste.

7. A machine for use in the assembly of plastic baby pants comprising a rotary table indexible through a number of working stations, a plurality of assembly plates mounted on said rotary table, said plates being indexible from work station to work station upon indexing of said rotary table, positioning means carried by said plates cooperable with pieces of plastic positioned on said plates to position the plastic pieces on said plates, said plastic pieces forming the baby pants being positioned on said plates as said plates move through said work stations, and welding means located at one of said work stations for effecting a welding of said plastic pieces on the assembly plate to form a complete baby pants assembly.

References Cited

UNITED STATES PATENTS 2,957,792   10/1960   Magid _____ 156—70 X

HAROLD ANSHER, Primary Examiner

M. E. McCAMISH, Assistant Examiner

U.S. Cl. X.R.

156—111, 306, 396, 556